March 14, 1933. B. H. LINCOLN 1,901,249
METHOD AND APPARATUS FOR CONVERTING HYDROGEN SULPHIDE INTO SULPHUR
Filed July 25, 1932
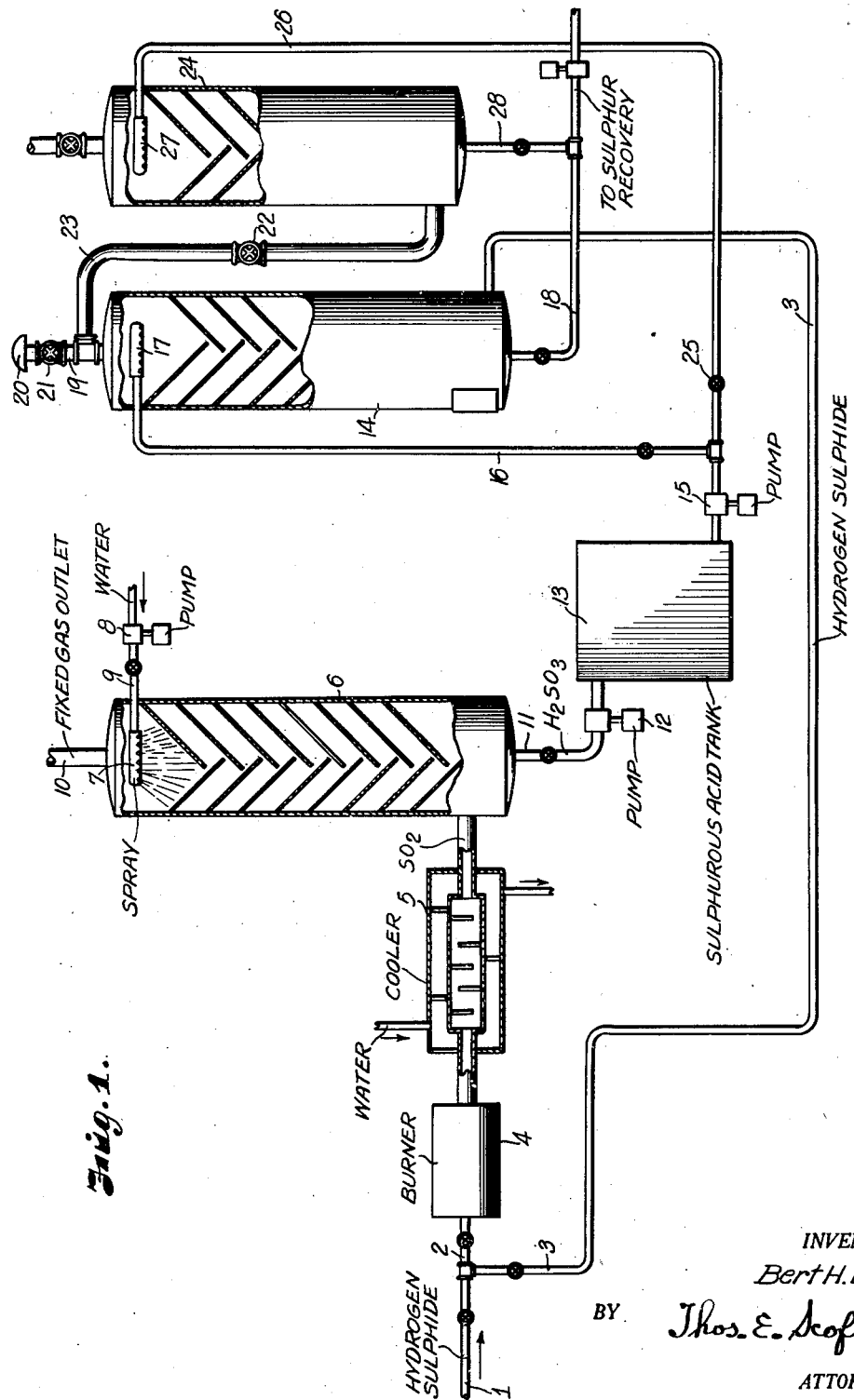
INVENTOR.
Bert H. Lincoln
BY Thos. E. Scofield
ATTORNEY.

Patented Mar. 14, 1933                                         1,901,249

UNITED STATES PATENT OFFICE

BERT H. LINCOLN, OF PONCA CITY, OKLAHOMA, ASSIGNOR TO CONTINENTAL OIL COMPANY, OF PONCA CITY, OKLAHOMA, A CORPORATION OF DELAWARE

METHOD AND APPARATUS FOR CONVERTING HYDROGEN SULPHIDE INTO SULPHUR

Application filed July 25, 1932. Serial No. 624,641.

My invention relates to a method and apparatus for converting hydrogen sulphide into sulphur.

Hydrogen sulphide occurs in a number of processes in large quantities. One example of this is in a process involving the removal of hydrogen sulphide gas obtained from the treatment of certain high sulphur content petroleum oils. There are a number of methods for removing hydrogen sulphide from these hydrocarbon gases. An important method is described in United States Letters Patent No. 1,783,901 to R. R. Bottoms. In practicing the Bottoms process, substantially pure hydrogen sulphide gas is obtained. It is difficult to dispose of hydrogen sulphide in large quantities due to its poisonous character and its noxious odor. If the hydrogen sulphide is burned to sulphur dioxide, a similar problem of disposing of the sulphur dioxide presents itself. Inasmuch as sulphur dioxide is injurious to vegetation and will contaminate streams, it is likewise difficult to effectually dispose of the sulphur dioxide.

The object of my invention is to provide a method of disposing of hydrogen sulphide in a safe and economical manner.

The accompanying figure which forms part of the instant specification and which is to be read in conjunction therewith, discloses a schematic view of one apparatus capable of carrying out my invention.

In general, my invention consists in splitting the volume of hydrogen sulphide into two streams. One stream is burned to form sulphur dioxide. The sulphur dioxide is then contacted with water to form sulphurous acid. The other stream of hydrogen sulphide is contacted with the sulphurous acid to form elemental sulphur by an oxidation reduction reaction. The sulphur is then removed by any of the well known methods. For example, it may be dehydrated, melted, and molded to give blocks of sulphur or may be recovered in a finely divided state, of value for the manufacture of insecticides.

The chemical reactions involved are:
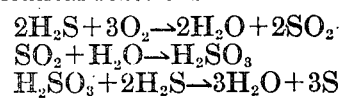
$$2H_2S + 3O_2 \rightarrow 2H_2O + 2SO_2$$
$$SO_2 + H_2O \rightarrow H_2SO_3$$
$$H_2SO_3 + 2H_2S \rightarrow 3H_2O + 3S$$

More particularly referring now to the drawing, hydrogen sulphide from any suitable source such as from the Bottoms operation, which is to be disposed of, enters pipe 1 and is split into two streams, one flowing through pipe 2 and the other flowing through branch pipe 3. It is to be understood that these streams may be regulated by suitable flow controllers. The stream from pipe 2 is led to burner 4 where it is burned to form sulphur dioxide. The burner 4 may be of any suitable type and I have found that the pressure type of burner gives very good results. The sulphur dioxide and any inert gases resulting from the use of an excess of air are then passed through cooler 5 to reduce the temperature thereof. The cold sulphur dioxide gas enters near the bottom of absorber tower 6. Positioned in the upper part of absorber tower 6 is a spray 7, through which water, pumped by pump 8 through line 9 issues. The water absorbs the sulphur dioxide content of the products of combustion to form sulphurous acid. If sufficient water is used, the gases leaving absorber 6 through pipe 10 should be free of sulphur dioxide. Inasmuch as an excess of air is used in the burner to insure the complete combustion of all of the hydrogen sulphide, a certain amount of fixed gases will escape through pipe 10. If desired, the gases from pipe 10 may be passed through water or through another tower similar to tower 6 to insure that all of the sulphur dioxide is removed from the products of combustion. The sulphurous acid which is formed is withdrawn from the tower 6 through pipe 11 by pump 12 and passes into storage tank 13.

The other stream of hydrogen sulphide passing through pipe 3 is introduced into the bottom of absorber tower 14. Sulphurous acid from tank 13 is pumped by pump 15 through line 16 to spray 17. The ascending hydrogen sulphide contacting with the descending sulphurous acid causes a precipitation of sulphur which is removed with the water and/or dilute acid solution through line 18. Any fixed gases which might be present in tower 14 pass out through line 19 and may be discharged into the atmosphere through pipe 20. If any hydrogen sulphide is present in the gases passing through pipe 19, valve 21 in pipe 20 may be closed and valve 22 in pipe 23 may be opened to permit the gases containing hydrogen sulphide to pass into the second tower 24. By opening valve 25, sulphurous acid may be introduced through line 26 to spray 27 to complete the removal of hydrogen sulphide, the sulphur and water and/or dilute sulphurous acid being withdrawn through line 28 and passed to line 18. The water and sulphur slurry which is removed through line 18 may be passed to a filter or to a Dorr thickener. The separated sulphur may be dehydrated and dried by warming and gently air blowing, or by heating in an autoclave. It is to be understood, of course, that the method of recovering sulphur will depend upon the intended use of the recovered sulphur. If it is to be used as an insecticide the water sulphur slurry may be separated by filtration. If desired, the recovered sulphur may be purified of any traces of sulphurous acid by means of a water wash.

To insure complete removal, and decomposition of all hydrogen sulphide, an excess of sulphurous acid should be present in tower 14. A great excess of sulphurous acid is not necessary because the reaction is very rapid and water and elemental sulphur being formed will not react. It is contemplated that normal pressures and temperatures will be used in the tower, inasmuch as the reaction is sufficiently rapid at these temperatures and pressures. It is to be understood, however, that higher pressures and temperatures may be employed if desired.

It will be appreciated that I have accomplished the objects of my invention and I am enabled by my process to dispose of the hydrogen sulphide in an economical and expeditious manner. In order to practice my process, it is not necessary that pure hydrogen sulphide be used inasmuch as the presence of foreign gases in the products of combustion has no deleterious effect upon the formation of sulphurous acid and likewise the presence of foreign gases in contacting towers 14 and 24 wil not prevent the sulphurous acid and hydrogen sulphide reaction from taking place.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A proces of converting hydrogen sulphide into sulphur comprising the steps of burning a portion of the hydrogen sulphide to form sulphur dioxide, absorbing the sulphur dioxide thus formed in water to form sulphurous acid, and contacting the sulphurous acid with the remaining portion of the hydrogen sulphide to form sulphur.

2. A continuous process of converting hydrogen sulphide into sulphur comprising the steps of flowing the hydrogen sulphide in an elongated confined stream, splitting the stream into two separated sub-streams, burning one of said streams to form sulphur dioxide, contacting the sulphur dioxide with water to form sulphurous acid, and simultaneously with said burning and contacting steps forming sulphur by contacting the other of said sub-streams with the sulphurous acid.

3. A continuous proces of converting hydrogen sulphide into sulphur comprising the steps of dividing the hydrogen sulphide to be converted into two streams, burning one of said streams to form sulphur dioxide, cooling the products of said combustion, contacting the sulphur dioxide with water to form sulphurous acid, and simultaneously with said steps contacting the other hydrogen sulphide stream with sulphurous acid thus formed to form sulphur and continuously withdrawing the sulphur formed.

4. An apparatus for the conversion of hydrogen sulphide into sulphur comprising in combination a pair of conduits communicating with a source of hydrogen sulphide, a burner communicating with one of said conduits, a first gas and liquid contact means communicating with said burner, means for supplying water to said first contactor, a second gas and liquid contact means, said second contactor being in communication with said first contactor and said other hydrogen sulphide conduit, means for supplying the products formed in said first contactor to said second contactor, and means for withdrawing the products formed in said second contactor.

In testimony whereof I affix my signature.

BERT H. LINCOLN.